United States Patent [19]

Schnell

[11] 3,936,005

[45] Feb. 3, 1976

[54] PERFORATED PLATE FOR CRUSHING MACHINES

[76] Inventor: Karl Schnell, Muhlstr. 28, Winterbach, Germany, 7065

[22] Filed: June 26, 1974

[21] Appl. No.: 483,422

[30] Foreign Application Priority Data

June 30, 1973 Germany ........................... 2333399

[52] U.S. Cl. .................................. 241/83; 241/82.5

[51] Int. Cl.² ........................................... A47J 43/07

[58] Field of Search .......... 241/82.2, 82.5, 82.1, 83, 241/84

[56] References Cited

UNITED STATES PATENTS 3,762,658 10/1973 Barnes ............................... 241/82.5

*Primary Examiner*—Roy Lake

*Assistant Examiner*—E. F. Desmond

*Attorney, Agent, or Firm*—McGlew and Tuttle

[57] ABSTRACT

A plate for crushing machines comprises a circular perforated plate having a marginal annular area adjacent its periphery which includes a narrow strip which is not perforated and which is located at unequal radii from the center of the plate around its circumference. The non perforated zone comprises at least one narrow annular strip sector and one or more arched or loop like areas which extend outwardly at greater radii from the center of the axis than the sectors. The plate advantageously includes a central bore for facilitating its mounting in the crushing machine.

7 Claims, 1 Drawing Figure

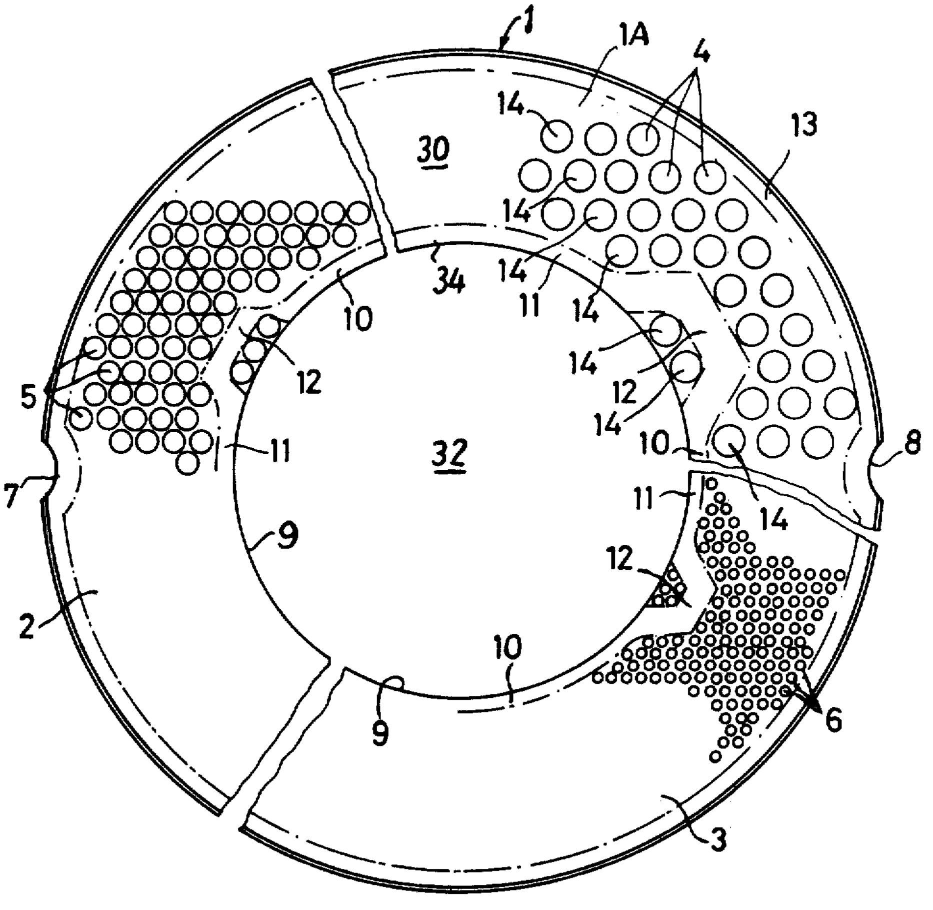
1
1A
4
14
13
30
14
14
34
10
11
14
5
12
14
12
14
10
11
8
32
7
11
14
9
12
2
10
9
6
3

PERFORATED PLATE FOR CRUSHING MACHINES

BACKGROUND OF THE INVENTION

1. Field of the Invention

This invention relates in general to the construction of crushing machines and in particular to a new and useful perforated plate for crushing machines.

2. Description of the Prior Art

The invention relates to a circular perforated plate having a non-perforated zone and which is to be mounted into a crushing machine. The non-perforated zone is intended for the reinforcement of the perforated plate. In the perforated plates known up to date, this zone is of circular shape. Because a wear of the cutters takes place only in zones of the perforated plate which are provided with holes, the play between cutter and non-perforated zone decreases gradually during the service time of the crushing machine and this produces an increased friction in this area. The result is that in the area of the non-perforated zone, the perforated plate is heated up much more than in the zone of the perforations. The heat development may finally increase to such an extent that cracks are formed or the plate even breaks. In such a case, considerable damages may be caused in the machine.

SUMMARY OF THE INVENTION

The present invention is directed to the problem of avoiding or at least reducing the heat development and the heat accumulation in the non-perforated zone of the perforated plate of a crushing machine.

To solve the problem for a perforated plate of this type, the non-perforated zone is provided along a strip, in accordance with the invention, which extends at an unequal radial distance from the center of the perforated plate around its circumference. The result thereof is that some time or other, the cutters are moved with their whole width past perforations of the perforated plate and, consequently, worn off along their entire length. In this manner, the cutters are prevented from irregular wear and the increased friction with the resulting heat development is avoided.

A particularly preferred embodiment of the invention is characterized in that the non-perforated zone is formed by at least one annular sector or strip and one or more angular, arched, or look-like areas adjacent the ends of this annular sector or sectors, and that at least one hole is provided inwardly of the annular strip area. According to a further development of the invention, the annular section or sectors of the non-perforated zone are located at the inner circumference of the annular perforated plate and strip area or areas extend radially outwardly at the loops toward the outer circumference of the perforated plate.

Preferably, each hole situated inwardly of the loop of the non-perforated strip area has the same diameter as the perforations of the plate. In addition, it is particularly advantageous, if a plurality of holes is provided inwardly of each of the loop portions, to align the holes in a pattern corresponding to that of the plate perforations. The two last-named features make it possible to make all the perforations with the same tool.

In accordance with another feature of the invention there are provided two loop-like areas of the non-perforated zone which are offset relative to each other by 180°. Finally, in view of the manufacture, it is very advantageous to provide that the widths of the loop-like areas are slightly larger than that of the remaining annular strip and particularly approximately corresponding to a spacing of the perforation pattern of the plate. The annular strip zones should be relatively narrow to permit the accommodation on the plate of as much perforations as possible. The actual width is determined by the strength requirements alone.

On the other hand, the loop-like areas of the non-perforated zone may be provided in a width such that, dependent on the diameter of the perforations, holes of two, or perhaps also more, perforation rows are left out in the respective area. It is further very advantageous, for reasons of manufacture, if a perforation pattern comprising aligned rows is chosen so that the holes situated inwardly of the loop area or areas are also aligned with the row or rows provided outside this area or areas.

Accordingly it is an object of the invention to provide a plate for circular crushing machines which includes a circular perforated plate having a marginal annular area adjacent its periphery which includes a narrow strip of said annular area which is non-perforated and which is spaced outwardly from the center of the perforated plate by unequal amounts around its circumference.

A further object of the invention is to provide a perforated plate for a crushing machine which is simple in design, rugged in construction and economical to manufacture.

For an understanding of the principles of the invention, reference is made to the following description of a typical embodiment thereof as illustrated in the accompanying drawings.

BRIEF DESCRIPTION OF THE DRAWINGS

In the Drawings:

The only FIGURE of the drawings is a top plan view of a plate constructed in accordance with the invention including three separate segmental portions having plate perforations of different diameters such as would normally be found in three distinct embodiments of the invention.

GENERAL DESCRIPTION OF PREFERRED EMBODIMENT

Referring to the drawings in particular there is provided a plate generally designated 1 which comprises an annular perforated marginal area 30 and a central bore 32 for facilitating the mounting of the plate on a crushing machine.

In accordance with the invention three separate plates are represented in a composite plate which includes annular sectors 1A, 2 and 3. Each sector portion 1A, 2 and 3 is designed to illustrate a separate embodiment of the complete plate each of which would have the overall configuration shown in the drawing. Thus, in respect to each embodiment only a third portion is shown in each case. The embodiment variations show coarse perforations 4 for the plate 1, intermediate sized perforations 5 for the plate 2 and fine perforations 6 for the plate 3.

In accordance with the invention each plate is designed to have an outer periphery with two notches or circular recesses 7 and 8 which are offset by 180° and which are provided for affixing the plate to a crushing machine (not shown).

In accordance with the plate it includes an annular narrow strip area 34 which does not have any perforations and which is spaced outwardly from the center of the perforated plate by unequal amounts proceeding around its circumference.

The non-perforated annular narrow strip 34 advantageously includes an annular area 10 and 11 which is located at the interior of the hollow plate 1 at the inner boundary of the annular marginal area 30. The two annular areas 10 and 11 extend concentrically into the inner circumference 9 of each perforated plate and the ends of these areas associated with each other are connected through a loop-like area 12 which extends radially outwardly from the center of the plate. In all embodiments of the plates the width of the loop like areas is larger than the remaining areas of the annular strip 34. A so-called clamping border or margin 13 is defined adjacent the outer periphery of the composite plate 1 is made of the same width as the non-perforated narrow strip 34. Ignoring the clamping border 13, the cutting operation will take place in dependence on the angular position of the cutter or cutters forming along with the perforated plate 1 a cutting set which extends over the whole width of the perforated plate. This is due to the fact that at least one hole is also provided in the areas of the perforated plate which are surrounded by the loop-like strips 12. The perforated plate 1A has two and the perforated plate 2 has 3 adjacent holes situated inwardly of the loop-like area 12. Perforated plate 3 has five such holes arranged in two adjacent rows. In the other areas of the perforated plate the perforations are made in uniformly spaced rows. The holes situated inwardly of the loop-like areas 12 belong to one or more of the respective rows of the perforations 4, 5 or 6 which are interrupted by the loop-like areas.

In the perforated plates 1a and 2 two such rows of the perforations are interrupted by the loop-like areas while in the perforated plate 3 three such rows are so interrupted. The perforations or holes of one of the rows of the perforated plate 1 are indicated by reference numeral 14. Not only the rows but also the individual perforations or holes are uniformly spaced from each other. Moreover, all of the holes of each of the perforated plates have the same diameter.

While a specific embodiment of the invention has been shown and described in detail to illustrate the application of the principles of the invention, it will be understood that the invention may be embodied otherwise without departing from such principles.

What is claimed is:

1. A plate for crushing machine, comprising a circular perforated ring-shaped plate having a central hole and an annular area surrounding the hole, said annular area having a narrow strip adjacent the hole which is not perforated and which is spaced outwardly from the center of the perforated plate by unequal amounts around its circumference, said non-perforated strip having at least one annular sector and at least one loop area and wherein at least one perforation is located with the loop area.

2. A plate according to claim 1, wherein said annular sector is situated at the inner edge of said annular area.

3. A plate for crushing machine, comprising a circular perforated ring-shaped plate having a central hole and an annular area surrounding the hole, said annular area having a narrow strip adjacent the hole which is not perforated and which is spaced outwardly from the center of the perforated plate by unequal amounts around its circumference, said narrow strip including radially outwardly extending loop areas having at least some of said perforations of said plate within said loop areas and some perforations extending outwardly of said narrow strip which are arranged in the same pattern as the perforations of said loop area.

4. The plate according to claim 3, wherein said narrow strip comprises at least two radially outwardly extending loop areas offset by 180°.

5. The plate according to claim 3, wherein the widths of the loop areas are larger than the width of the remaining portion of said narrow strip.

6. A plate according to claim 5, including a second perforated annular strip which is located outwardly of said narrow strip and adjacent the outer edge of said annular area.

7. A plate for a crushing machine, comprising a circular ring-shaped perforated plate having a central circular hole and an annular area surrounding the hole, said annular area having a narrow strip adjacent the inner edge of said plate and which is not perforated and which includes at least portions which extend radially outwardly toward the outer edge of the perforated plate, at least one of the perforations of said plate being located between the portions of said arrow strip which extend radially outwardly toward the outer edge of said plate and the inner edge of said plate.

* * * * *